(12) United States Patent
Mansell et al.

(10) Patent No.: US 8,041,930 B2
(45) Date of Patent: Oct. 18, 2011

(54) DATA PROCESSING APPARATUS AND METHOD FOR CONTROLLING THREAD ACCESS OF REGISTER SETS WHEN SELECTIVELY OPERATING IN SECURE AND NON-SECURE DOMAINS

(75) Inventors: David Hennah Mansell, Cambridge (GB); Stuart David Biles, Little Thurlow (GB); David Michael Gilday, Chatteris (GB); Daniel Kershaw, Cambridge (GB)

(73) Assignee: ARM Limited, Cambridge (GB)

( * ) Notice: Subject to any disclaimer, the term of this patent is extended or adjusted under 35 U.S.C. 154(b) by 972 days.

(21) Appl. No.: 11/919,757

(22) PCT Filed: May 11, 2005

(86) PCT No.: PCT/GB2005/001842
§ 371 (c)(1),
(2), (4) Date: Nov. 1, 2007

(87) PCT Pub. No.: WO2006/120367
PCT Pub. Date: Nov. 16, 2006

(65) Prior Publication Data
US 2009/0094439 A1    Apr. 9, 2009

(51) Int. Cl.
*G06F 9/00*    (2006.01)
(52) U.S. Cl. ...................................................... 712/229
(58) Field of Classification Search .................. None
See application file for complete search history.

(56) References Cited

U.S. PATENT DOCUMENTS

| | | | |
|---|---|---|---|
| 5,838,986 A | 11/1998 | Garg et al. | |
| 6,092,175 A * | 7/2000 | Levy et al. | 712/23 |
| 6,161,166 A * | 12/2000 | Doing et al. | 711/125 |
| 6,233,599 B1 | 5/2001 | Nation et al. | |
| 6,535,905 B1 * | 3/2003 | Kalafatis et al. | 718/108 |
| 6,954,846 B2 * | 10/2005 | Leibholz et al. | 712/43 |
| 7,178,062 B1 * | 2/2007 | Dice | 714/38 |

(Continued)

FOREIGN PATENT DOCUMENTS

WO          01/46800        6/2001

OTHER PUBLICATIONS

European Patent Office, International Search Report, Jan. 27, 2006, 3 pages.*

(Continued)

*Primary Examiner* — David Huisman
(74) *Attorney, Agent, or Firm* — Nixon & Vanderhye P.C.

(57) ABSTRACT

The data processing apparatus has processing logic for performing data processing operations and a register bank for storing data associated with the processing logic. The register bank has at least one register group, each register group having a plurality of register sets. The processing logic has an operating state associated with each register group defining how that register group is used, a first operating state being a state in which each register set in the register group is used to support an independent execution thread of the processing logic, and a second operating state being a state in which the register sets of the register group are collectively used to support a single execution thread of the processing logic. Control logic is provided to control how the register sets of each register group are used dependent on the operating state associated with that register group.

7 Claims, 4 Drawing Sheets

| PROCESSOR OPERATING STATE | THREAD | NS BIT | CONTROL BIT | REGISTERS ACCESSED |
|---|---|---|---|---|
| MULTI-THREADED | 0 | * | 1 | NB0 + B0 |
| MULTI-THREADED | 1 | * | 1 | NB1 + B1 |
| TZ (SECURE) | * | 0 | 0 | NB0 + B0 |
| TZ (NON-SECURE) | * | 1 | 0 | NB0 + B1 |

* = DON'T CARE

U.S. PATENT DOCUMENTS

| | | | |
|---|---|---|---|
| 7,290,261 B2 * | 10/2007 | Burky et al. | 718/107 |
| 7,418,582 B1 * | 8/2008 | Iacobovici et al. | 712/228 |
| 2003/0126416 A1 * | 7/2003 | Marr et al. | 712/235 |
| 2003/0140245 A1 * | 7/2003 | Dahan et al. | 713/200 |
| 2004/0133767 A1 | 7/2004 | Chaudhry et al. | |
| 2004/0268093 A1 * | 12/2004 | Samra et al. | 712/217 |

OTHER PUBLICATIONS

European Patent Office, Written Opinion of the International Searching Authority, Jan. 27, 2006, 8 pages.*

European Patent Office, International Preliminary Report on Patentability, Aug. 27, 2007, 12 pages.*

* cited by examiner

| PROCESSOR OPERATING STATE | THREAD | NS BIT | CONTROL BIT | REGISTERS ACCESSED |
|---|---|---|---|---|
| MULTI-THREADED | 0 | * | 1 | NB0 + B0 |
| MULTI-THREADED | 1 | * | 1 | NB1 + B1 |
| TZ (SECURE) | * | 0 | 0 | NB0 + B0 |
| TZ (NON-SECURE) | * | 1 | 0 | NB0 + B1 |

* = DON'T CARE

DATA PROCESSING APPARATUS AND METHOD FOR CONTROLLING THREAD ACCESS OF REGISTER SETS WHEN SELECTIVELY OPERATING IN SECURE AND NON-SECURE DOMAINS

This application is the U.S. national phase of International Application No. PCT/GB2005/001842 filed 11 May 2005 the entire content of which is hereby incorporated herein by reference.

FIELD OF THE INVENTION

The present invention relates to a data processing apparatus and method employing multiple register sets, and in particular to techniques for making efficient use of such multiple register sets.

BACKGROUND OF THE INVENTION

It is known to provide a data processing apparatus having a multi-threading architecture, in which a processor of the data processing apparatus has access to a plurality of different sets of registers, each register set being associated with a different execution thread of the processor. Such a multi-threading architecture at the hardware level (i.e. through the provision of multiple register sets) provides significant performance improvements for the data processing apparatus, since by increasing the amount of processing work available at any point in time, this tends to increase the amount of useful work that can be performed by the data processing apparatus at that time. For example, when a particular execution thread reaches a point where a significant delay is incurred, for example due to the requirement to perform a fetch of a data value from memory, then the processor can switch to another execution thread at that time with minimal delay, due to the fact that the execution context of that other execution thread is already available in the associated register set provided for that other execution thread. As used herein, the term "execution context" refers to the architectural state associated with a given execution thread, typically most if not all of this architectural state being provided by the contents of the register set associated with that execution thread, and hence for example the execution context will identify certain control parameters applicable to the processor when executing that execution thread, and certain data values accessible by the processor when executing that execution thread.

As another example of where such a multi-threading architecture can provide significant performance improvements, in a multi-issue apparatus having multiple functional units, instructions from a second thread can be run on functional units that are not currently needed by a first thread and would otherwise be idle. As yet another example, the processor could run alternating threads on alternating clock cycles to diminish the effect of register read delays, etc.

In addition to the above multi-threaded architectures, there also exist certain single-threaded architectures, where the processor only has a single execution thread. Whilst in such a single-threaded architecture the processor will normally use a single register set, it is sometimes the case that certain registers within the register set are "banked", i.e. duplicated, such that when transitioning from a certain mode of operation to another mode of operation, certain architectural state can be retained within the banked registers associated with the mode being exited, such that on a return to that mode those items of architectural state are readily available. Such single-threaded architectures that employ banked registers will be referred to herein as "single-threaded banked architectures".

One particular example of a data processing apparatus that employs such a single-threaded banked architecture has a processor which is operable in a plurality of modes and either a secure domain or a non-secure domain. The plurality of modes include at least one non-secure mode being a mode in the non-secure domain and at least one secure mode being a mode in the secure domain. The processor is operable such that when executing a program in a secure mode the program has access to secure data which is not accessible when the processor is operating in a non-secure mode. In such a system, a certain number of the registers are banked so that when the processor is operating in a non-secure mode, one of the banked group of registers is used, whilst when the processor is operating in a secure mode, the other banked group of registers is used. The remainder of the registers in the register set are non-banked, and are accordingly shared between both domains. Hence, when transitioning from the secure domain to the non-secure domain, such non-banked registers would typically be flushed so that any secure data associated with that secure domain is not accessible in the non-secure domain. In the following text, this particular example of a single-threaded architecture employing both a secure domain and a non-secure domain will be referred to as a TrustZone (TZ) architecture. An example of a data processing apparatus having such a TZ architecture is described in GB-A-2,402,785.

When adopting a single-threaded banked architecture such as the TZ architecture, this increases the size and cost of the data processing apparatus since extra silicon area is provided to contain the banked registers. Any multi-threaded architecture would also require additional registers to be provided to accommodate the additional execution contexts applicable to the multiple execution threads.

Whilst it is desirable to use data processing systems employing multi-threaded architectures, due to the performance benefits that can be realised, it is also desirable to support within such data processing systems software developed for single-threaded banked architectures such as the above-mentioned TZ architecture, since much effort will have been invested in producing robust, certified software for such architectures. However, a multi-threaded data processing apparatus already requires additional register sets to be provided to accommodate the multiple execution contexts, and if each of these execution contexts also has to provide the extra banked registers required by certain single-threaded banked architectures such as the TZ architecture, this will further increase the size and cost of the data processing apparatus and hence make that data processing apparatus less attractive, particularly for applications which do not make use of the single threaded banked architecture.

Accordingly, it would be desirable to provide a multi-threaded data processing apparatus which provided a more efficient mechanism for supporting software written for single-threaded banked architectures, for example a multiple domain architecture such as the TZ architecture.

SUMMARY OF THE INVENTION

Viewed from a first aspect, the present invention provides a data processing apparatus, comprising: processing logic operable to perform data processing operations; a register bank operable to store data associated with the processing logic, the register bank having at least one register group, each register group comprising a plurality of register sets; the processing logic having an operating state associated with each register group defining how that register group is used, a first operating state being a state in which each register set in the register group is used to support an independent execution thread of the processing logic, and a second operating state being a state in which the register sets of the register group are collectively used to support a single execution thread of the processing logic; and control logic operable to control how the register sets of each register group are used dependent on the operating state associated with that register group.

In accordance with the present invention, the processing logic has an operating state associated with each register group of the register bank defining how that register group is used. In particular, a first operating state can be specified which is a state in which each register set in the register group is used to support an independent execution thread of the processing logic. Accordingly, in this first operating state, the processing logic can execute multiple threads, with each thread having a separate register set associated with it such that data applicable to that thread is stored in the associated register set.

Further, in accordance with the present invention, a second operating state can be specified which is a state in which the register sets of the register group are collectively used to support a single execution thread of the processing logic. This hence enables the processing logic to operate, for the particular register group in question, in a single threaded manner. This would be useful in situations where the processing logic when executing in such a single threaded manner requires more architectural state, and hence more register space, than is required for any individual thread when operating in the first operating state. In such cases, the register sets of the register group are collectively used to the extent necessary to provide that additional register space. This may for example be due to that fact that a larger number of registers are required than would typically be needed by any particular thread being executed in a multi-threaded environment, or because wider registers are needed. One example of the former situation is where certain registers need to be banked to support execution of a program written for a single-threaded banked architecture. In particular, in accordance with the present invention, in such situations the processing logic can be configured to have the second operating state for a particular register group, such that the processing logic will then execute a single execution thread, and the required banked registers can be provided by the registers of different register sets within the register group.

Considering the specific example mentioned earlier of the TZ architecture, it will be appreciated that if the register bank has a total of "X" register sets, then the data processing apparatus of the present invention can support X separate execution contexts, so as to allow multi-threaded execution of X program threads, or can provide X/2 execution contexts each of which can support execution of a single TZ program thread. It will also be appreciated that the determination as to whether the first operating state or the second operating state applies can be made on a register group by register group basis.

Hence, considering one specific example where the register bank has four register sets, then it will be appreciated that the data processing apparatus can support two TZ threads (two register sets being used to support each TZ thread), one TZ thread and two normal threads (i.e. two independent execution threads each having its own associated register set) or four normal threads. Considering another particular example where the register bank contains just two separate register sets, then it can be seen that in accordance with the present invention the data processing apparatus can support two independent execution threads, each with its own associated register set, or, using the same physical resources, can support a single TZ thread in which the pair of register sets are used collectively to provide the required registers, including the required banked registers.

Accordingly, it can be seen that the present invention provides a particularly efficient technique for enabling a data processing apparatus with a multi-threaded architecture to also support execution of software developed for a single-threaded architecture, which is particularly beneficial when such software developed for the single-threaded architecture requires the use of banked registers, or in any case is written so as to need more registers than are typically required for an execution thread in a multi-threaded environment.

The number of register groups provided within the register bank can be varied dependent on the implementation. However, in one embodiment the register bank comprises a single register group.

Similarly, the number of register sets provided within each register group may be varied dependent on the implementation. However, in one embodiment each register group comprises a pair of register sets. In one particular embodiment, the register bank comprises a single group consisting of two register sets.

The single execution thread supported by a register group in the second operating state can take a variety of forms. However, in one embodiment, in the second operating state the processing logic is selectively operable in either a secure domain or a non-secure domain. In such a second operating state, some registers will typically be required that are specific to the secure domain, whilst certain other registers will typically be required that are specific to the non-secure domain; other registers will be shared between both domains. In one particular embodiment, in the second operating state, a first register set of the associated pair of register sets contains a first subset of registers that are used when operating in the secure domain or the non-secure domain and a second subset of registers that are only used when operating in one of the secure or non-secure domains, when the processing logic is operating in the other of the secure or non-secure domains a number of registers in a second register set of that associated pair of register sets being used instead of the second subset of registers. Hence, by such an approach, the required banked registers can be provided by appropriate registers in the second register set.

The registers of the register bank can take a variety of forms. However, in one embodiment, each register set in the register bank comprises working registers operable to store data for manipulation by the processing logic and/or control registers operable to store one or more control parameters for controlling operation of the data processing apparatus. Typically, the single execution thread of the processing logic supported in the second operating state will require some of the control registers to be banked, and additionally may require a number of the working registers to be banked, and again this can be achieved in embodiments of the present invention through selected use of registers from the different register sets of the relevant register group.

In one embodiment, the data processing apparatus further comprises a control value register operable to store for each register group an operating state control value identifying the operating state associated with that register group, the control logic being responsive to each operating state control value to control how the register sets of the associated register group are used. This provides an efficient technique for configuring the control logic to provide the appropriate control of use of the register sets of each register group.

In one embodiment, the control logic comprises a number of control units, one control unit being provided for each register group. In one such embodiment each control unit is operable to receive the operating state control value for the associated register group, a thread control value indicating for the first operating state which execution thread is being executed by the processing logic, and a non-secure control value indicating for the second operating state whether the processing logic is operating in either the secure domain or the non-secure domain, and to control in dependence on these control values how the register sets of that associated register group are used. The use of these three independent signals provides a particularly efficient technique for controlling the various control units of the control logic to perform the required control of use of the register sets of each register group.

Through use of embodiments of the present invention, as mentioned above, software written for a single-threaded banked architecture can be efficiently supported within a data processing apparatus providing a multi-threaded architecture. In a particular example, a program written for the TZ architecture can be supported on such a data processing apparatus. In accordance with one embodiment of the present invention, new software designed to operate using dedicated secure and non-secure threads can be written to take advantage of the multi-threaded nature of the data processing apparatus of embodiments of the present invention. In particular, in one embodiment, in the first operating state each register set of at least one register group has associated therewith a security value indicating whether the associated execution thread is executing in the secure domain or the non-secure domain. This hence enables secure threads and non-secure threads to be executed in a multi-threaded architecture, with the security value of the associated register sets being set accordingly. In one embodiment, the security value will be exported to the caches, MMU and external memory system as a means to control accesses.

In one particular embodiment where it is not required to provide support for pre-existing software written having regard to the TZ model, then a data processing apparatus may be provided which only provides the first operating state and not the second operating state, with the use of the security value associated with each register set of at least one register group being used to support execution of new secure software utilising dedicated secure threads.

Viewed from a second aspect, the present invention provides a data processing apparatus, comprising: processing means for performing data processing operations; register bank means for storing data associated with the processing means, the register bank means having at least one register group, each register group comprising a plurality of register sets; the processing means having an operating state associated with each register group defining how that register group is used, a first operating state being a state in which each register set in the register group is used to support an independent execution thread of the processing means, and a second operating state being a state in which the register sets of the register group are collectively used to support a single execution thread of the processing means; and control means for controlling how the register sets of each register group are used dependent on the operating state associated with that register group.

Viewed from a third aspect, the present invention provides a method of operating a data processing apparatus having processing logic for performing data processing operations, and a register bank for storing data associated with the processing logic, the register bank having at least one register group, each register group comprising a plurality of register sets, the method comprising the steps of: associating an operating state with each register group defining how that register group is used, a first operating state being a state in which each register set in the register group is used to support an independent execution thread of the processing logic, and a second operating state being a state in which the register sets of the register group are collectively used to support a single execution thread of the processing logic; and controlling how the register sets of each register group are used dependent on the operating state associated with that register group.

BRIEF DESCRIPTION OF THE DRAWINGS

The present invention will be described further, by way of example only, with reference to an embodiment thereof as illustrated in the accompanying drawings, in which.

DESCRIPTION OF AN EMBODIMENT

Figure 1:
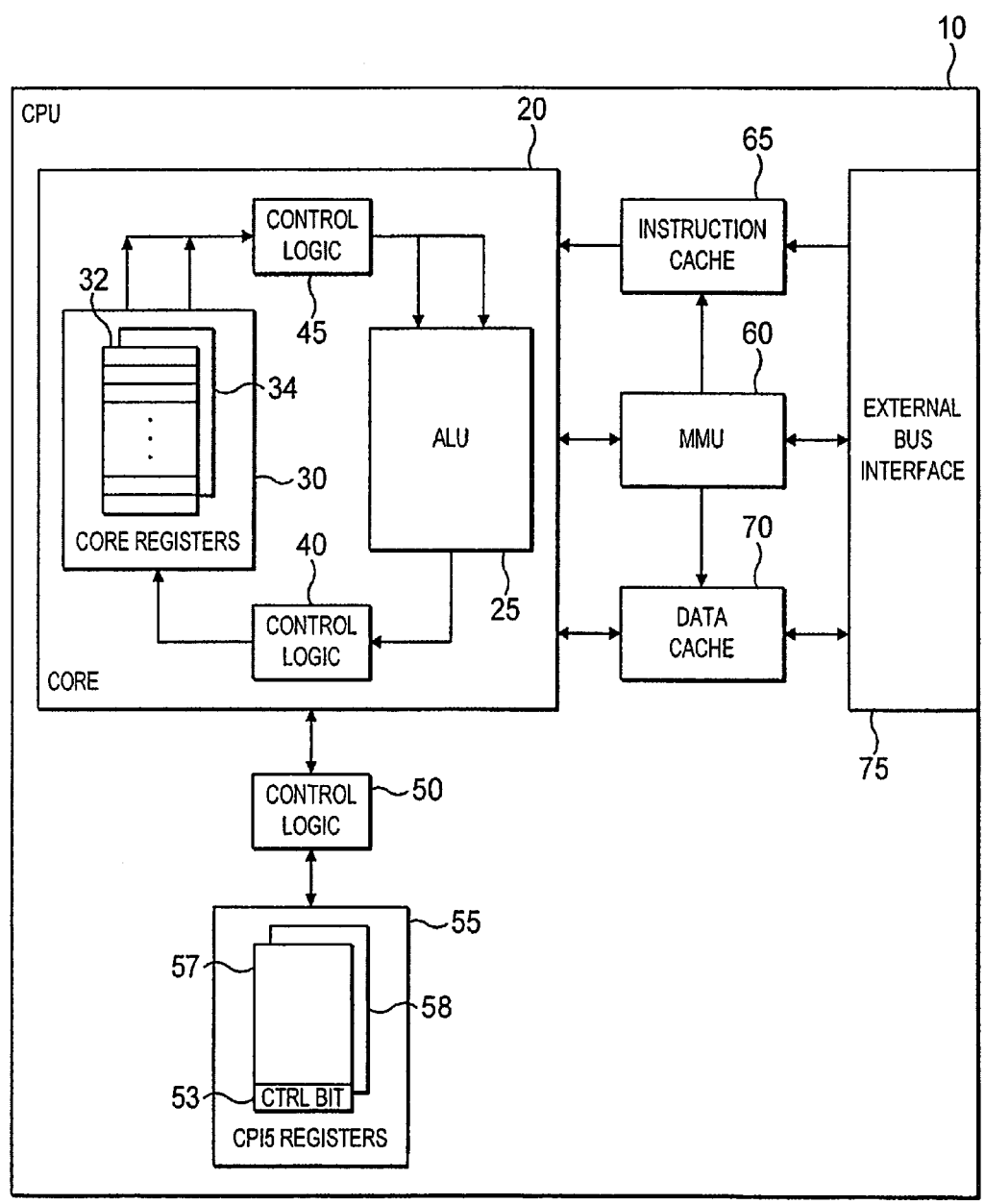
FIG. 1 is a block diagram of a data processing system in accordance with one embodiment of the present invention.

FIG. 1 is a block diagram of a data processing system in accordance with one embodiment of the present invention. In particular, the data processing system comprises a Central Processing Unit (CPU) 10 within which is provided a processor core 20. Within the processor core 20 is provided an Arithmetic Logic Unit (ALU) 25 arranged to execute sequences of instructions in order to perform data processing operations. Data required by the ALU 25 is stored within core registers 30, which in one embodiment of the present invention consists of two sets of core registers 32, 34. In the example illustrated in FIG. 1, two read ports are provided from the core registers 30, and one write port, and accordingly two operands can be routed to the ALU 25 at the same time, whilst a single result value can be output from the ALU for storing back to the core registers 30.

In one embodiment of the present invention, the way in which the core registers 30 are used can be configured dependent on an operating state of the ALU 25, and control logic 40, 45 is provided to control the use of the core registers dependent on the operating state.

In addition to the core registers 30, various control registers 55 will be provided for defining certain control parameters applicable to the various elements of the data processing system 10, these control registers being referred to herein as coprocessor 15 (CP15) registers. As with the core registers 30, in one embodiment the CP15 registers 55 consist of two sets of control registers 57, 58. Further, as with the core registers 30, control logic 50 is provided in association with the CP15 registers 55 to control how the sets of CP15 registers 57, 58 are used dependent on the operating state.

The core registers 30 and CP15 registers 55 can collectively be considered to form a register bank within which is provided a pair of register sets, the first register set consisting of the core registers 32 and the CP15 registers 57, and the second register set consisting of the core registers 34 and the CP15 registers 58. This hence enables the core 20 to operate as a multi-threaded processor in which two independent execution threads can be executed, the first register set 32, 57 containing data associated with the first thread and the second register set 34, 58 containing data associated with the second thread. As will be discussed in more detail later, in accordance with one embodiment of the present invention these two register sets can alternatively be configured to be used collectively to support a single TZ execution thread executing within the core 20.

As shown in FIG. 1, an additional control register 53 is provided within the CP15 registers 55, this register being referred to herein as the control value register. The control value register 53 has no counterpart in the second set of CP15 registers 58. The control value register 53 contains a control bit defining whether the operating state of the processor associated with the register sets of the register bank is a first operating state or a second operating state. The first operating state is a state in which each register set 32, 57 and 34, 58 is used to support an independent execution thread of the core 20, whereas the second operating state is a state in which the register sets are collectively used to support a single TZ execution thread of the core 20. The control bit held in the control value register 53 is input to the control logic 40, 45, 50 as one of the control signals used to enable the control logic to control how the register sets are used dependent on the operating state. Whilst for the purposes of illustration the control logic 40, 45, 50 has been shown as three discrete blocks in FIG. 1, it will be appreciated that the control logic can actually be embodied as a single piece of logic if desired.

The data processing apparatus also includes a level one memory system, taking the form of an instruction cache 65 for storing instructions to be executed on the core 20, a data cache 70 for storing data to be accessed by the core 20 when executing those instructions, and a memory management unit (MMU) 60 for managing the memory access requests issued by the core 20, and to provide appropriate control signals to the instruction cache 65 and the data cache 70. When an access request is issued by the core 20, the MMU 60 will perform certain control functions, for example to check access permissions in order to determine that the core in its current mode of operation is entitled to access the memory location identified in the access request. The MMU 60 will also check region attributes, for example to determine whether the memory location being accessed is cacheable. In addition, the MMU 60 will typically perform any virtual to physical address translation required. As a result of these activities, the MMU 60 will send the required control signals to the instruction cache 65 and/or the data cache 70. If the data value (whether that be an instruction or data) the subject of the access request is present in the instruction cache 65 or the data cache 70, then that data value can be accessed directly in the instruction cache 65 or data cache 70, whereas if the data value is not present in the appropriate cache, then the access request will be propagated via the external bus interface 75 to other levels of memory. This will result in the data value being returned to the appropriate cache 65, 70, from where it can then be accessed by the core 20.

In the multi-threaded operating state, the caches 65, 70 and MMU 60 will be shared between the two execution threads. In the multiple domain, TZ, operating state, the caches 65, 70 and MMU 60 will hold security related information to help maintain the integrity of the secure data.

One or more of the CP15 registers 55 will contain control data appropriate to the MMU 60, for example defining a page table base address from which the MMU 60 can access the required page tables to perform its memory management functions. In the multi-threaded operating state, it will be appreciated that different control parameters may be applicable to each thread. Additionally, in the second operating state where the single TZ execution thread is being supported, it will be appreciated that again a different set of control parameters may be appropriate for the MMU 60.

Figure 2:
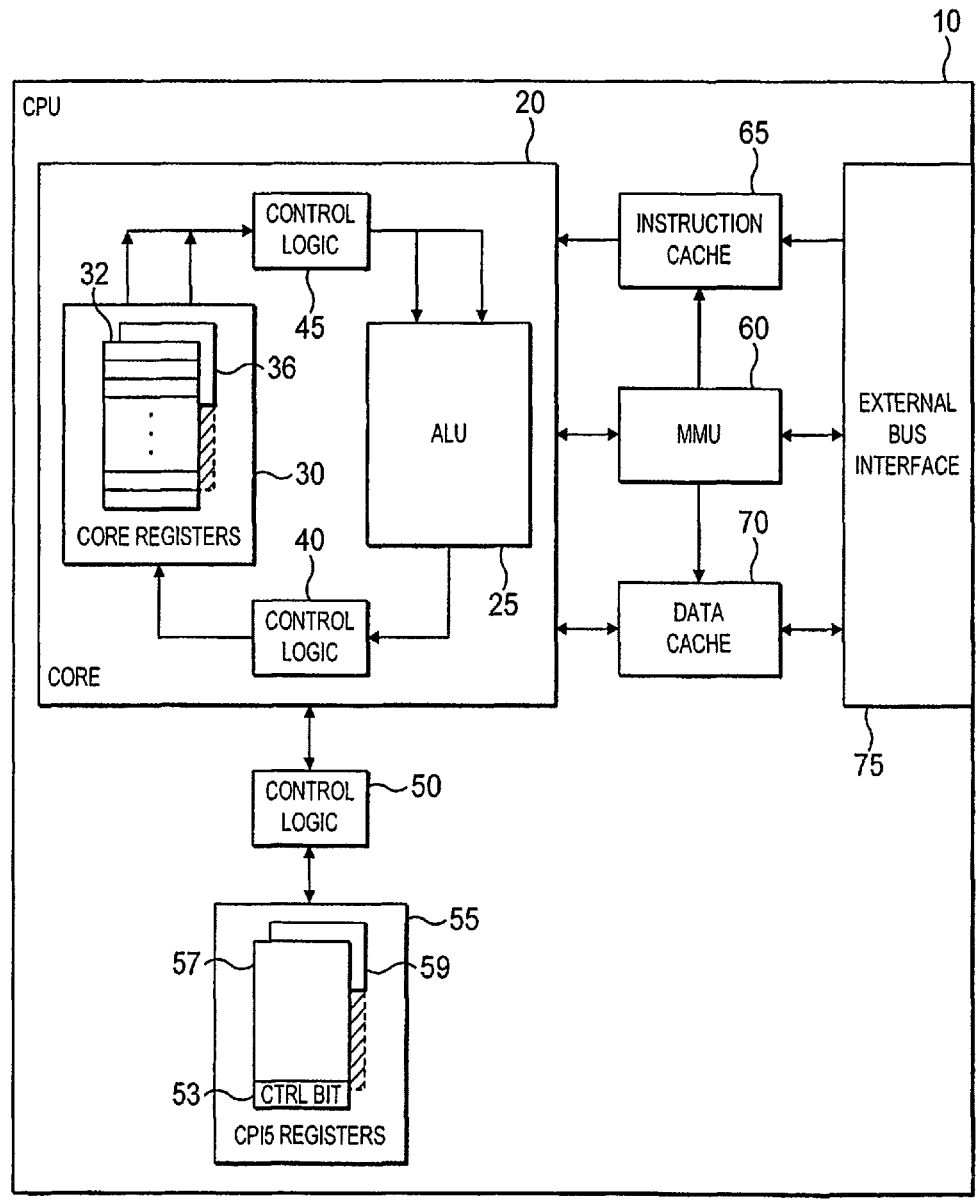
FIG. 2 is a block diagram of the same data processing system as shown in FIG. 1, but with the register sets configured to support a single execution thread.

As discussed earlier, in accordance with one embodiment of the present invention, the core 20 can have a first operating state in which each register set 32, 57 and 34, 58 is used to support an independent execution thread of the core 20, and accordingly in this operating state the core 20 operates as a multi-threaded processor. Additionally, in one embodiment, the core 20 can be configured to have a second operating state in which the control logic 40, 45, 50 is arranged to cause both register sets to collectively be used to support a single TZ execution thread using banked registers. FIG. 2 is a diagram of the same CPU 10 as shown in FIG. 1, but in which the way in which the registers 30, 55 are used in this second operating state is shown. In particular, the entirety of the first register set 32, 57 is made available, but only a subset 36 of the second set of core registers and a subset 59 of the second set of CP15 registers is made available. These subsets 36, 59 of the second register set are used to provide the banked register functionality required by the TZ architecture for a number of the registers used by TZ software.

Figure 3:
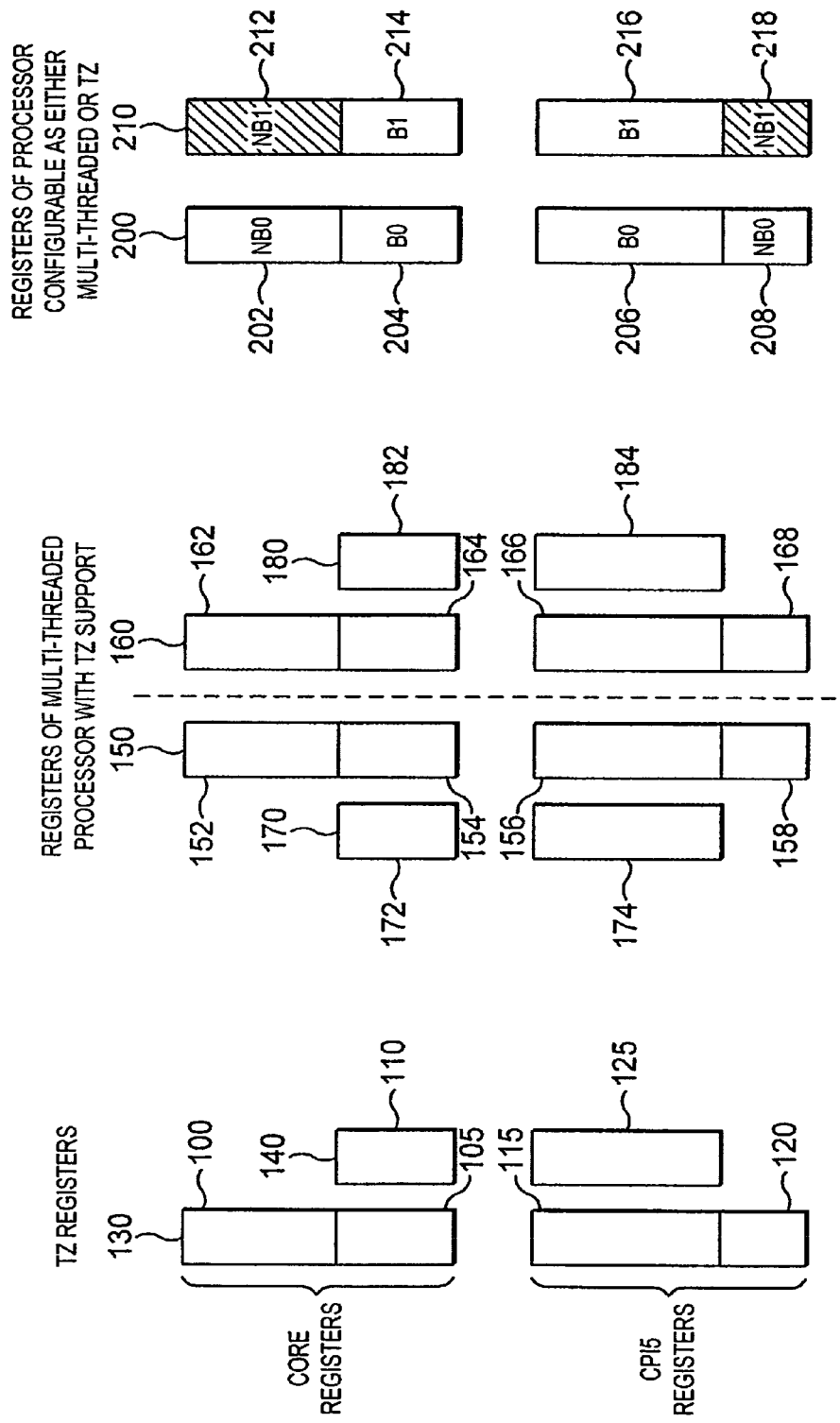
FIG. 3A is a diagram schematically illustrating the registers required to support the TZ architecture.
FIG. 3B schematically illustrates the registers that would in principle be required to support the TZ architecture within a multi-threaded processor capable of supporting two independent execution threads.
FIG. 3C is a diagram schematically illustrating the registers provided in an embodiment of the present invention, which are configurable so as to either support two independent execution threads, or alternatively to support a single TZ execution thread.

The registers required to support execution of a program in accordance with the TZ architecture are illustrated schematically in FIG. 3A. A first register set 130 is provided that contains core registers and CP15 registers. The CP15 registers consist of a number of registers 120 which do not need to be banked, and a number of registers 115 which need to be banked. For the banked registers, it is hence necessary to provide a corresponding number of additional registers 125, which can be considered to form part of a second register set 140.

Whilst in some implementations it may not be necessary to bank any of the core registers, in one embodiment the core registers do contain a number of registers 100 which do not need to be banked, and a number of registers 105 which do need to be banked. Accordingly, for the banked core registers, a corresponding number of registers 110 need to be provided as part of the second set of registers 140.

FIG. 3A hence provides an illustration of the registers which would normally be provided in any single-threaded processor that supported the TZ architecture. If the TZ architecture were to be supported in a multi-threaded processor, then typically this could be achieved by adopting the register layout illustrated schematically in FIG. 3B. As can be seen in FIG. 3B, the basic register layout for the TZ architecture is replicated in the block of registers provided for each thread, FIG. 3B illustrating a multi-threaded processor capable of supporting two independent threads. Accordingly, for the first thread, there is a first set of registers 150, comprising non-banked registers 152, 158 and banked registers 154, 156, and accordingly for the banked registers a second register set 170 is provided containing corresponding registers 172, 174.

Similarly, for the second thread, a register set 160 is provided containing non-banked registers 162, 168 and banked registers 164, 166, and again for the banked registers a second register set 180 is provided containing the corresponding registers 182, 184.

As will be appreciated from FIG. 3B, the adoption of such an approach within a multi-threaded processor calls for a significant number of additional registers over and above those already required to support the multi-threaded function of the processor. This significantly increases the cost and size of the processor and makes the processor less attractive, particularly for applications which do not require support for the TZ architecture.

FIG. 3C schematically illustrates the registers provided within the processor 20 of one embodiment of the present invention to provide support for both multi-threaded applications and legacy applications written for the TZ architecture. As can be seen, the register bank consists of two sets of registers 200, 210, the first register set 200 containing non-banked portions 202, 208 and banked portions 204, 206. Similarly, the second register set 210 has non-banked portions 212, 218 and banked portions 214, 216. When the processor is operating in a standard multi-threaded manner, the distinction between the non-banked and banked portions is not relevant, and instead the entirety of the first register set 200 is used to support the first execution thread and the entirety of the second register set 210 is used to support the second execution thread. However, if alternatively the processor 20 is configured to support a single TZ execution thread, then the control logic 40, 45, 50 of FIGS. 1 and 2 controls the use of the register bank such that the non-banked portions 212, 218 of the second register set 210 are not used, and the remaining portions of both register sets are collectively used to support the TZ application. As can be seen, the remaining portions 202, 204, 206, 208, 214, 216 enable an exact replication of the required TZ register arrangement illustrated in FIG. 3A.

Figures 4, 5:
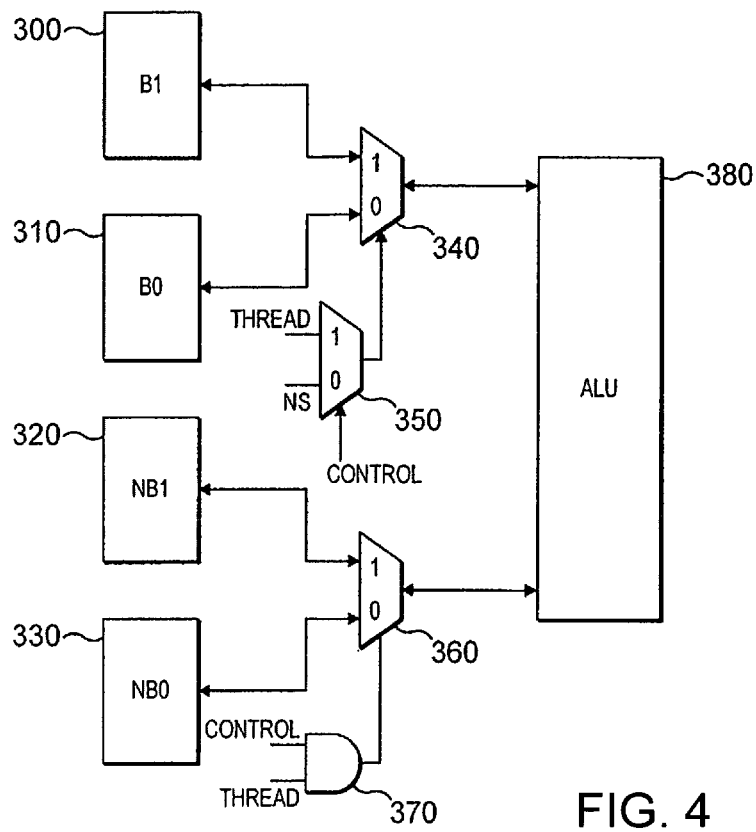
FIG. 4 is a block diagram illustrating the function of the control logic of FIGS. 1 and 2 in accordance with one embodiment of the present invention.
FIG. 5 is a table illustrating which registers are accessed dependent on operating state in accordance with one embodiment of the present invention.

FIG. 4 is a block diagram illustrating the format of the control logic 40, 45, 50 of FIGS. 1 and 2, as it pertains to the interface with the ALU 25 of the core 20. Since the contents of the CP15 registers 55 control the behaviour of the core 20, they also affect other parts of the system (including the caches 65, 70 and MMU 60), and accordingly it will be appreciated that similar control structures to those shown in FIG. 4 will also be provided on the relevant control paths to make sure the appropriate registers are used at any particular point in time by those other parts of the system.

In FIG. 4, the representation of the various banked and un-banked registers in FIG. 3C has been simplified. In particular, the banked registers B1 300 in FIG. 4 represents both portions 214 and 216 of FIG. 3C, the banked registers B0 310 represent both portions 204, 206 of FIG. 3C, the non-banked portion NB1 320 represents portions 212 and 218 of FIG. 3C and the non-banked portion NB0 330 represents portions 202 and 208 of FIG. 3C.

The banked registers 300, 310 are coupled to a multiplexer/demultiplexer unit 340 which receives as a control signal the output from a multiplexer 350. The multiplexer 350 receives as one input a "thread" signal identifying for the first operating state which execution thread is being executed by the core 20, and receives as a second input a non-secure (NS) control signal indicating for the second operating state whether the processor is operating in either the secure domain or the non-secure domain. The multiplexer 350 receives as a control input signal the control bit stored in register 53 shown in FIGS. 1 and 2, which is set to a logic one value if the processor is operating in the first operating state, i.e. is operating as a multi-threaded processor, and has a logic zero value if the processor is operating in the second operating state, i.e. as a single-threaded processor supporting the TZ architecture through provision of banked registers. Hence, if the processor is operating in the first operating state, the multiplexer/demultiplexer 340 is controlled in accordance with the thread signal, whereas if the processor is operating in accordance with the second operating state, then the multiplexer/demultiplexer 340 is controlled in accordance with the NS signal.

The thread signal is set to a logic zero value if thread zero is being executed and a logic one if thread one is being executed, and the NS signal is set to a logic zero value if the ALU is operating in the secure domain and is set to a logic one value if the ALU is operating in the non-secure domain.

The non-banked registers 320, 330 are connected to a multiplexer/demultiplexer 360 which receives as an input control signal the output from AND gate 370. AND gate 370 receives as its inputs the control bit from register 53 and the earlier-mentioned thread signal. Accordingly, if the control bit is not set, thereby indicating that the processor is operating as a single-threaded processor supporting the TZ architecture, then a logic zero value will be output from the AND gate 370 irrespective of the value of the thread signal, and will accordingly cause the non-banked registers 330 to be coupled to the ALU 380. If however the control signal is set to a logic one value, indicating that the processor is operating as a multi-threaded processor, then the multiplexer/demultiplexer 360 will be controlled in accordance with the value of the thread signal.

FIG. 5 is a table illustrating the registers that are accessed dependent on the processor operating state, and in particular indicating the values of the thread signal, NS bit signal and control bit signal provided to the control logic of FIG. 4 to cause the required registers to be accessed. From FIG. 5 it can be seen that if the processor is operating in the first operating state, i.e. is operating as a multi-threaded processor, then the accessed registers are registers 310 and 330 (i.e. the registers of the first register set 200) if thread zero is being executed and are registers 300, 320 (i.e. the registers of the second register set 210) if thread one is being executed. If instead the processor is operating in accordance with the second operating state, i.e. as a single threaded processor supporting the TZ architecture, then registers 310, 330 are accessed (i.e. the registers of the first register set 200) if the processor is operating in the secure domain, whilst if the processor is operating in the non-secure domain, registers 300 and 330 are accessed (i.e. registers 202, 208, 214 and 216 illustrated in FIG. 3C).

From the above description, it will be seen that embodiments of the present invention alleviate the register requirements of the data processing apparatus whilst still allowing the apparatus to support multi-threaded processing or to support single-threaded, banked register, processing in accordance with the TZ architecture. In particular, the core 20 illustrated in FIGS. 1 and 2 can support two multi-threaded execution contexts, or using the same physical resources can support a single context which supports the existing TZ architecture. The idea can be extended to processors with a larger number of register sets, and hence for example a design having four register sets can support two TZ threads, one TZ thread and two normal multi-threaded threads, or four normal multi-threaded threads.

The embodiment of the present invention hence allows a single CPU design to support both requirements without undue overheads from unwanted features.

A further enhancement that can be supported using embodiments of the present invention concerns the writing of future programs utilising dedicated secure and non-secure threads to enable the processor to operate in a secure domain or a non-secure domain. In particular, if such software is written having regard to the form of the data processing apparatus shown in FIG. 1 or 2, then a security value can be associated with each register set, which can be set to indicate whether the associated execution thread is executing in the secure domain or the non-secure domain. This hence enables the core 20 to operate in a multi-threaded manner, thus allowing the potential performance benefits of such a multi-threaded approach, whilst still performing the required functions of the TZ architecture. In this mode of operation, threads cannot be switched from one domain to the other, and hence there is no need for banked registers. The security value will be exported to the caches 65, 70, MMU 60 and external memory system as a means to control accesses. The caches 65, 70 and MMU 60 will be shared between the secure and non-secure threads but will hold security related information to help maintain the integrity of the secure data.

As a further enhancement, it will be appreciated that multiple instances of the CPU 10 could be incorporated within a single data processing system having access to shared memory, hence implementing a Symmetric Multi-Processing (SMP) design. Within each CPU 10 of the SMP design, the core 20 could be arranged to have either the first operating state or the second operating state, hence enabling tailoring of the system's use between standard multi-threaded use and single-threaded banked use supporting the TZ architecture. In one particular embodiment, one CPU could operate in the second operating state, to support a single-threaded banked application such as a TZ application, whilst the remaining CPUs could operate in the first, multi-threaded, operating state.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus, comprising:
    processing logic operable to perform data processing operations;
    a register bank operable to store data associated with the processing logic, the register bank having at least one register group, each register group comprising a plurality of register sets;
    the processing logic having an operating state associated with each register group defining how that register group is used, a first operating state being a state in which each register set in the register group is used to support an independent execution thread of the processing logic, and a second operating state being a state in which the register sets of the register group are collectively used to support a single execution thread of the processing logic, said single execution thread associated with said second operating state requiring more architectural state than is required for any independent execution thread associated with said first operating state; and
    control logic operable to control how the register sets of each register group are used dependent on the operating state associated with that register group, wherein each register group comprises a pair of register sets, wherein in the second operating state the processing logic is selectively operable in either a secure domain or a non-secure domain and a first register set of the associated pair of register sets contains a first subset of registers that are used when operating in the secure domain or the non-secure domain and a second subset of registers that are only used when operating in one of the secure or non-secure domains, wherein, when the processing logic is operating in the other one of the secure or the non-secure domains that does not use said second subset of registers, a number of registers in a second register set of that associated pair of register sets are used instead of the second subset of registers.

2. A data processing apparatus as claimed in claim 1, wherein the register bank comprises a single register group.

3. A data processing apparatus as claimed in claim 1, wherein each register set in the register bank comprises working registers configured to store data for manipulation by the processing logic and/or control registers operable to store one or more control parameters for controlling operation of the data processing apparatus.

4. A data processing apparatus as claimed in claim 1, further comprising:
    a control value register configured to store, for each register group, an operating state control value identifying the operating state associated with that register group, wherein the control logic is responsive to each operating state control value to control how the register sets of the associated register group are used.

5. A data processing apparatus as claimed in claim 4, wherein in the second operating state the processing logic is selectively operable in either a secure domain or a non-secure domain, and wherein the control logic comprises a number of control units, one control unit being provided for each register group, each control unit being operable to receive the operating state control value for the associated register group, a thread control value indicating for the first operating state which execution thread is being executed by the processing logic, and a non-secure control value indicating for the second operating state whether the processing logic is operating in either the secure domain or the non-secure domain, and to control in dependence on these control values how the register sets of that associated register group are used.

6. A data processing apparatus as claimed in claim 1, wherein in the second operating state the processing logic is selectively operable in either a secure domain or a non-secure domain, and wherein in the first operating state each register set of at least one register group has associated therewith a security value indicating whether the associated execution thread is executing in the secure domain or the non-secure domain.

7. A method of operating a data processing apparatus having processing logic for performing data processing operations, and a register bank for storing data associated with the processing logic, the register bank having at least one register group, each register group comprising a plurality of register sets, the method comprising the steps of:
    associating an operating state with each register group defining how that register group is used, a first operating state being a state in which each register set in the register group is used to support an independent execution thread of the processing logic, and a second operating state being a state in which the register sets of the register group are collectively used to support a single execution thread of the processing logic, said single execution thread associated with said second operating state requiring more architectural state information than is required for any independent execution thread associated with said first operating state; and controlling how the register sets of each register group are used dependent on the operating state associated with that register group; wherein each register group comprises a pair of register sets, wherein in the second operating state the processing logic is selectively operable in either a secure domain or a non-secure domain and a first register set of the associated pair of register sets contains a first subset of registers that are used when operating in the secure domain or the non-secure domain and a second subset of registers that are only used when operating in one of the secure or non-secure domains, and, when the processing logic is operating in the other one of the secure or the non-secure domains that does not use said second subset of registers, using a number of registers in a second register set of that associated pair of register sets instead of the second subset of registers.

* * * * *